US010305135B2

(12) United States Patent
Sakano et al.

(10) Patent No.: US 10,305,135 B2
(45) Date of Patent: May 28, 2019

(54) METHOD OF PRODUCING FUEL CELL STACK AND METHOD OF PRODUCING METAL SEPARATOR FOR FUEL CELL

(71) Applicant: HONDA MOTOR CO., LTD., Minato-ku, Tokyo (JP)

(72) Inventors: Masaaki Sakano, Wako (JP); Satoshi Oyama, Wako (JP); Masahiro Matsutani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 170 days.

(21) Appl. No.: 15/420,554

(22) Filed: Jan. 31, 2017

(65) Prior Publication Data

US 2017/0222247 A1    Aug. 3, 2017

(30) Foreign Application Priority Data

Feb. 2, 2016 (JP) .................................. 2016-017799
Jan. 18, 2017 (JP) .................................. 2017-006550

(51) Int. Cl.
*H01M 8/242* (2016.01)
*H01M 8/248* (2016.01)
*H01M 8/0206* (2016.01)
*H01M 8/0276* (2016.01)
*H01M 8/1004* (2016.01)
*H01M 8/1007* (2016.01)
(Continued)

(52) U.S. Cl.
CPC ......... *H01M 8/248* (2013.01); *H01M 8/0206* (2013.01); *H01M 8/0278* (2013.01); *H01M 8/0286* (2013.01); *H01M 8/1004* (2013.01); *H01M 8/1007* (2016.02); *H01M 8/242* (2013.01); *H01M 8/2457* (2016.02); *H01M 2250/20* (2013.01)

(58) Field of Classification Search
CPC .................................................. H01M 8/0286
See application file for complete search history.

(56) References Cited

U.S. PATENT DOCUMENTS 6,605,380 B2    8/2003    Chen et al.
7,294,428 B2    11/2007   Merlo et al.
2006/0054664 A1   3/2006    Strobel et al.
(Continued)

FOREIGN PATENT DOCUMENTS

JP    2005-510832 A    4/2005
JP    2006-190626 A    7/2006
(Continued)

OTHER PUBLICATIONS

English translation of JP 2006-228533 A printed Oct. 14, 2018 (Year: 2018).*

*Primary Examiner* — Maria Laios
(74) *Attorney, Agent, or Firm* — Carrier Blackman & Associates, P.C.; William D. Blackman; Joseph P. Carrier

(57) ABSTRACT

In a method of producing a fuel cell stack, press forming of a first metal separator of a power generation cell is performed to thereby form a first seal line as a seal around at least an oxygen-containing gas flow field. Further, a preliminary load is applied to the first seal line to thereby plastically deform the first seal line. Further, a joint separator and a membrane electrode assembly are stacked together, and a tightening load is applied to the joint separator and the membrane electrode assembly in a stacking direction, to thereby assemble the fuel cell stack.

9 Claims, 13 Drawing Sheets

(51) Int. Cl.
*H01M 8/2457* (2016.01)
*H01M 8/0286* (2016.01)

(56) References Cited

U.S. PATENT DOCUMENTS

| | | |
|---|---|---|
| 2006/0254047 A1 | 11/2006 | Strobel et al. |
| 2011/0033782 A1 | 2/2011 | Chin et al. |
| 2015/0136589 A1 | 5/2015 | Gehring et al. |

FOREIGN PATENT DOCUMENTS

| | | | | |
|---|---|---|---|---|
| JP | 2006-228533 A | * | 8/2006 | |
| JP | 2006-228533 A | | 8/2006 | |
| JP | 2008-010350 A | | 1/2008 | |
| JP | 2010-021025 A | | 1/2010 | |
| JP | 2014-093212 A | | 5/2014 | |
| JP | 2015-520486 A | | 7/2015 | |
| JP | 2016-015207 A | | 1/2016 | |

* cited by examiner

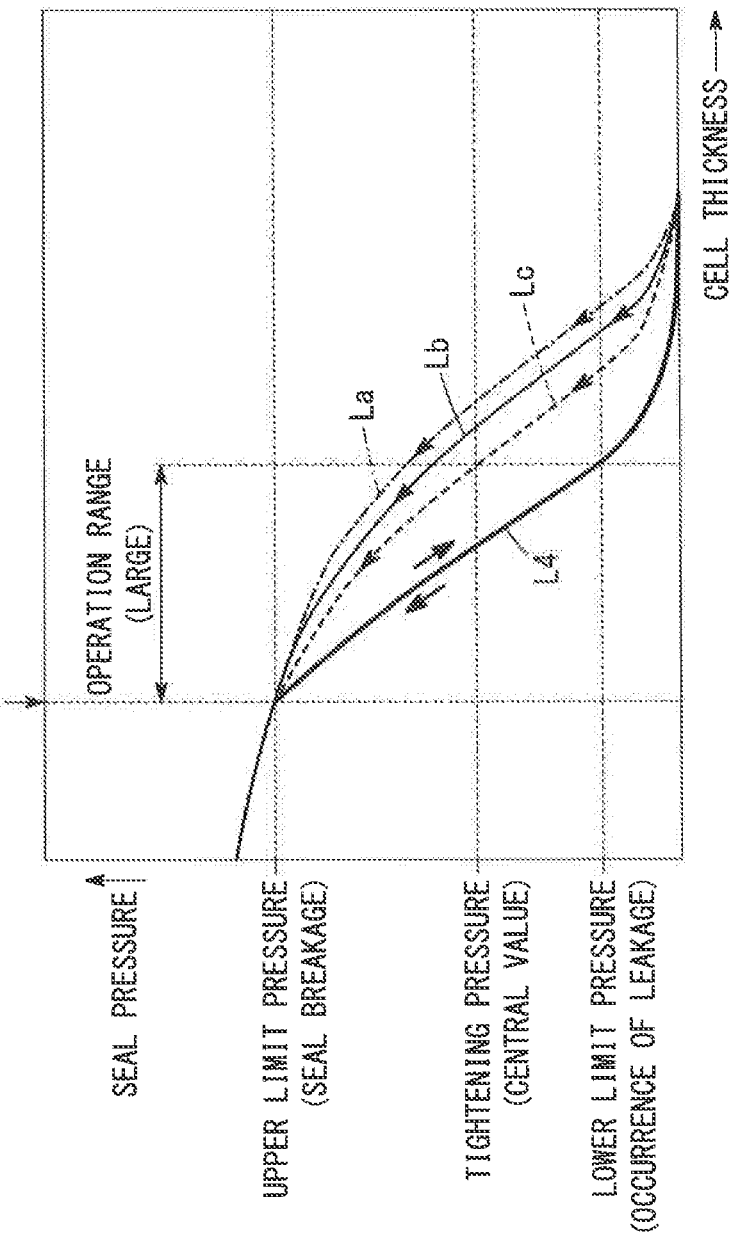

METHOD OF PRODUCING FUEL CELL STACK AND METHOD OF PRODUCING METAL SEPARATOR FOR FUEL CELL

CROSS-REFERENCE TO RELATED APPLICATIONS

This application is based upon and claims the benefit of priority from Japanese Patent Applications No. 2016-017799 filed on Feb. 2, 2016, and No. 2017-006550 filed on Jan. 18, 2017, the contents all of which are incorporated herein by reference.

BACKGROUND OF THE INVENTION

Field of the Invention

The present invention relates to a method of producing a fuel cell stack including a membrane electrode assembly and a metal separator. The membrane electrode assembly includes a pair of electrodes and an electrolyte membrane interposed between the electrodes. Further, the present invention relates to a method of producing a metal separator for a fuel cell.

Description of the Related Art

For example, a solid polymer electrolyte fuel cell includes a membrane electrode assembly (MEA) having an electrolyte membrane. The electrolyte membrane is a polymer ion exchange membrane. An anode is provided on one surface of the electrolyte membrane, and a cathode is provided on the other surface of the electrolyte membrane. The membrane electrode assembly is sandwiched between separators (bipolar plates) to form a power generation cell. Normally, a predetermined number of the power generation cells are stacked together to form a fuel cell stack. For example, the fuel cell stack is mounted in a fuel cell vehicle (fuel cell electric automobile, etc.) as an in-vehicle fuel cell stack.

In some cases, the fuel cell may adopt metal separators as the separators. In this regard, seal members are provided on the metal separators for preventing leakage of reactant gas such as an oxygen-containing gas and a fuel gas, and a coolant. Seals made of elastic rubber such as fluoro-rubber, silicone-rubber, or the like are used as the seal members. Use of such seal members push up the cost disadvantageously.

To this end, for example, as disclosed in the specification of the U.S. Pat. No. 6,605,380, it has been proposed to adopt a structure where sealing beads are formed on the metal separators instead of the elastic rubber seals. Since the sealing beads are fabricated by press forming, the product cost can be suppressed advantageously.

SUMMARY OF THE INVENTION

In the above sealing bead, when an external load is applied, large plastic deformation may occur. Therefore, due to load changes in the stacking direction of the metal separator, plastic deformation tends to occur in the sealing bead easily. Therefore, when disturbance is eliminated, it is not possible to generate the same seal surface pressure as before the plastic deformation.

The present invention has been made to solve problems of this type, and an object of the present invention is to provide a method of producing a fuel cell stack and a method of producing a fuel cell metal separator having simple steps in which it is possible to reliably obtain a desired seal surface pressure without causing plastic deformation even if load changes occur.

A fuel cell stack to which a production method according to the present invention is applied includes a plurality of power generation cells stacked in a stacking direction. Each of the power generation cells includes a membrane electrode assembly and metal separators. The membrane electrode assembly includes a pair of electrodes and an electrolyte membrane interposed between the electrodes. A fuel gas flow field configured to supply a fuel gas to one of the electrodes and an oxygen-containing gas flow field configured to supply an oxygen-containing gas to the other of the electrodes are formed between the membrane electrode assembly and the metal separators.

The method of producing the fuel cell stack includes the steps of forming a seal bead around at least the fuel gas flow field or the oxygen-containing gas flow field by press forming of the metal separators, so that each of the metal separators has one surface from which the seal bead protrudes and another surface opposite to the one surface, and joining two adjacent ones of the metal separators together in a state where the other surfaces of the metal separators abut against each other. Further the method includes the step of plastically deforming the seal bead by applying a preliminary load to the seal bead. Moreover, the method includes the step of stacking the metal separators and the membrane electrode assembly, and applying a tightening load to the metal separators and the membrane electrode assembly in the stacking direction to thereby assemble the fuel cell stack.

Further, in the production method, preferably, the preliminary load applied to the seal bead is the maximum load which is received in the stacking direction during power generation of the fuel cell stack. Further, in the production method, preferably, a resin frame member is provided on an outer periphery of the membrane electrode assembly, and a relationship of $k1>k2$ is satisfied where $k1$ denotes an elastic modulus of the metal separators, and $k2$ denotes an elastic modulus of the resin frame member. Further, in the production method, preferably, a resin material is provided on a top of the seal bead, and a relationship of $k1>k3>k2$ is satisfied, where $k3$ denotes an elastic modulus of the resin material.

Further, a fuel cell metal separator to which a production method according to the present invention is applied, and a membrane electrode assembly are stacked together to form a power generation cell. The membrane electrode assembly includes a pair of electrodes and an electrolyte membrane interposed between the electrodes. A fuel gas flow field configured to supply a fuel gas to one of the electrodes and an oxygen-containing gas flow field configured to supply an oxygen-containing gas to the other of the electrodes are formed in the metal separator.

The method of producing the metal separator includes the step of forming a seal bead around at least the fuel gas flow field or the oxygen-containing gas flow field by press forming of the metal separator. Further, the production method includes the step of plastically deforming the seal bead by applying a preliminary load to the seal bead.

Further, in the production method, preferably, the preliminary load applied to the seal bead is the maximum load which is received in the stacking direction of the metal separator during power generation of the fuel cell stack. Further, in the production method, preferably, the metal separator is a metal separator of a cell unit including three or more metal separators and two or more membrane electrode assemblies, the metal separator being provided between two of the membrane electrode assemblies.

In the present invention, before assembling the fuel cell stack, the seal bead is plastically deformed by applying a preliminary load to the seal bead. Therefore, in use of the fuel cell stack, even if load changes occur, the seal bead has the same load characteristics as the elastic rubber seal. Further, since a preliminary load is applied after two adjacent ones of the metal separators have been joined together, it is possible to correct deformation of the metal separators caused at the time of joining.

Accordingly, with simple steps, no plastic deformation due to load changes occurs. Therefore, it becomes possible to reliably obtain a desired seal surface pressure.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 13 is a view showing an operation range of the joint separator according to the second embodiment.

DESCRIPTION OF THE PREFERRED EMBODIMENTS

Figure 1:
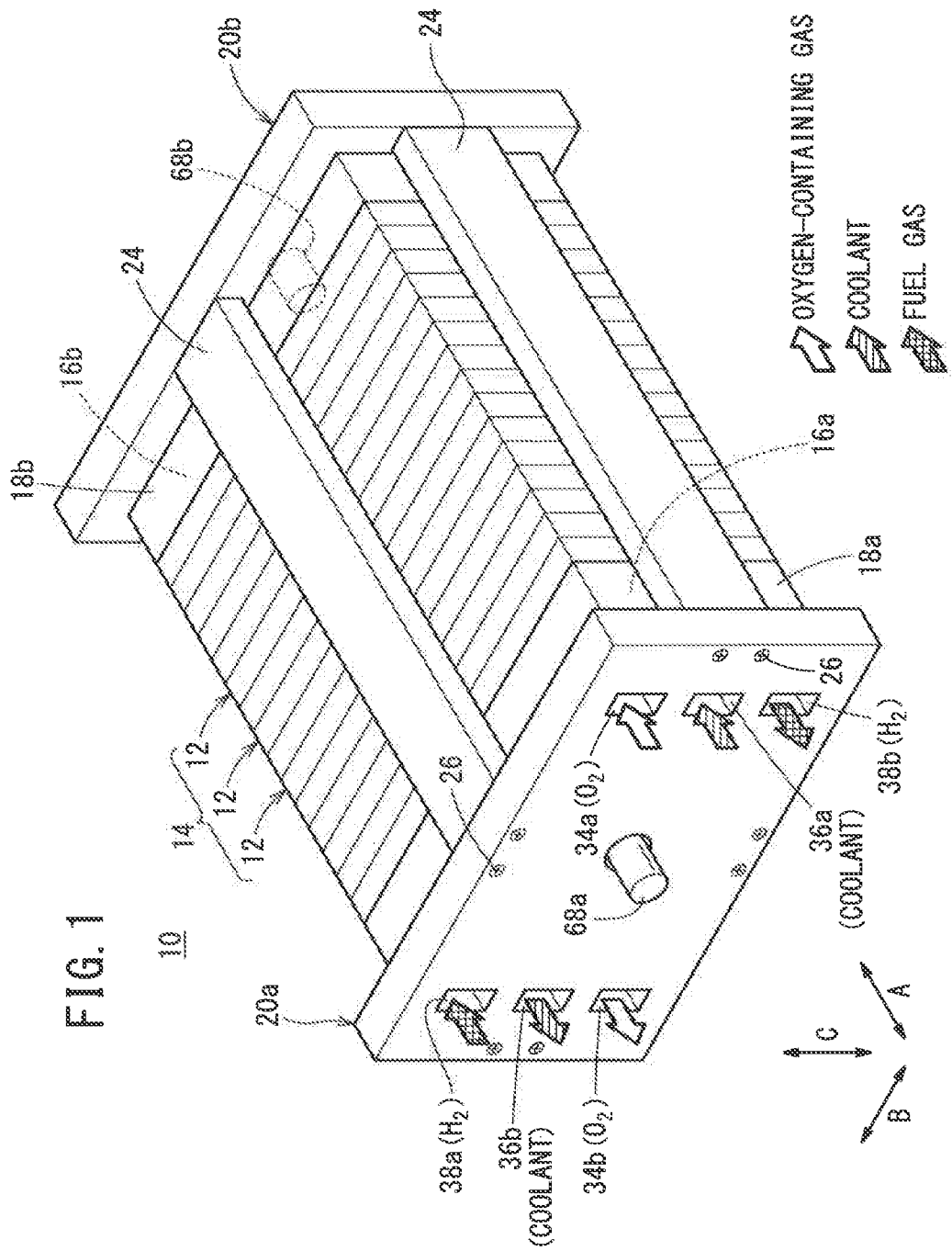
FIG. 1 is a perspective view showing a fuel cell stack to which a production method according to the present invention is applied.
Figure 2:
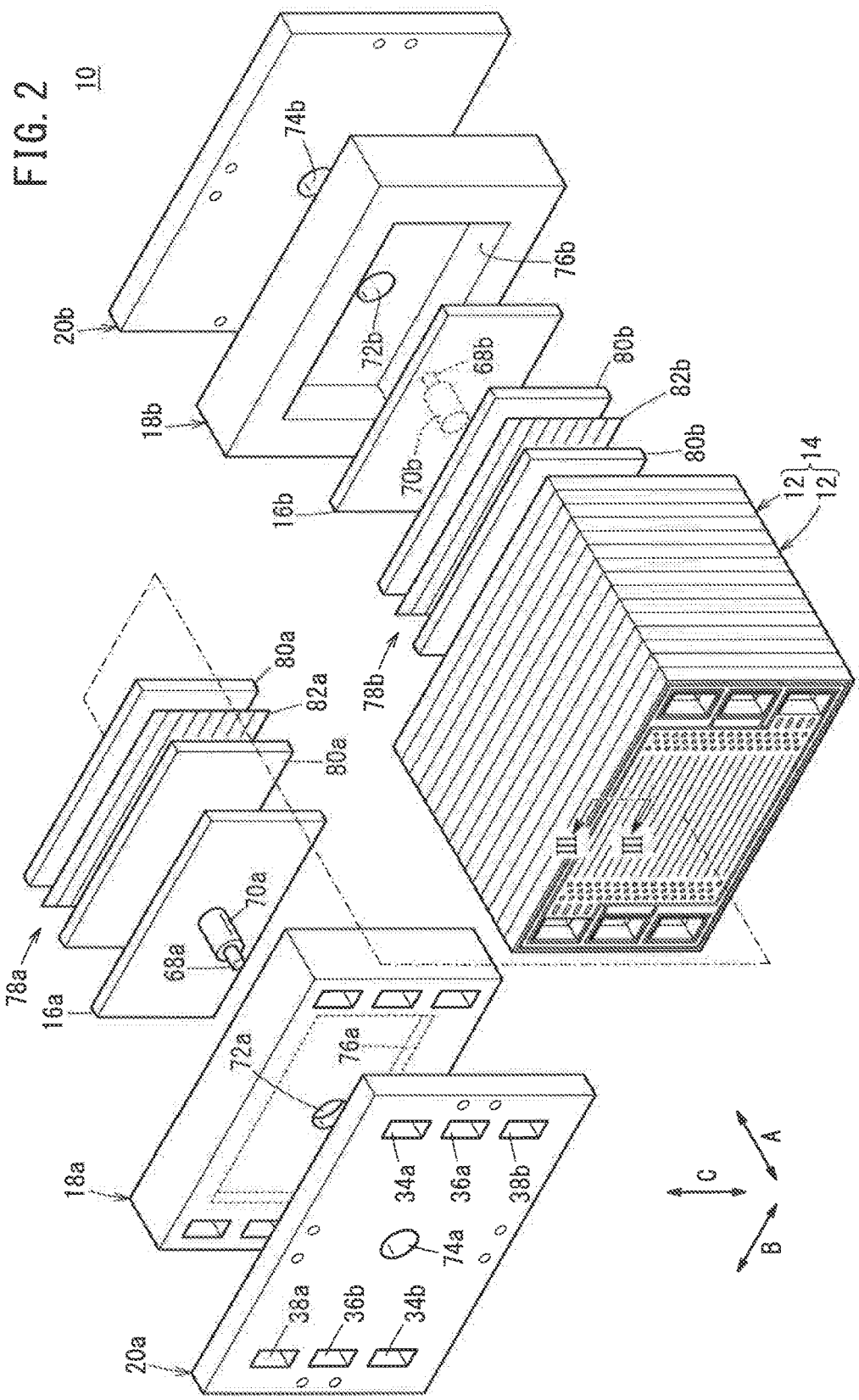
FIG. 2 is a partial exploded perspective view schematically showing the fuel cell stack.

As shown in FIGS. 1 and 2, a fuel cell stack 10 to which a production method according to the present invention is applied includes a stack body 14 formed by stacking a plurality of power generation cells 12 in a horizontal direction indicated by an arrow A or in a gravity direction indicated by an arrow C. For example, the fuel cell stack 10 is mounted in a fuel cell vehicle such as a fuel cell electric automobile (not shown).

At one end of the stack body 14 in the stacking direction indicated by the arrow A, a terminal plate 16a is provided. An insulator 18a is provided outside the terminal plate 16a, and an end plate 20a is provided outside the insulator 18a (see FIG. 2). At the other end of the stack body 14, a terminal plate 16b is provided. An insulator 18b is provided outside the terminal plate 16b. An end plate 20b is provided outside the insulator 18b.

As shown in FIG. 1, the end plates 20a, 20b have a horizontally elongated (or vertically elongated) rectangular shape, and coupling bars 24 are provided between respective sides of the end plates 20a, 20b. Both ends of each of the coupling bars 24 are fixed to the inner surfaces of the end plates 20a, 20b through bolts 26 to apply a tightening load to the stacked power generation cells 12 in the stacking direction indicated by the arrow A. It should be noted that the fuel cell stack 10 may have a casing including the end plates 20a, 20b, and the stack body 14 may be placed in the casing.

Figure 3:
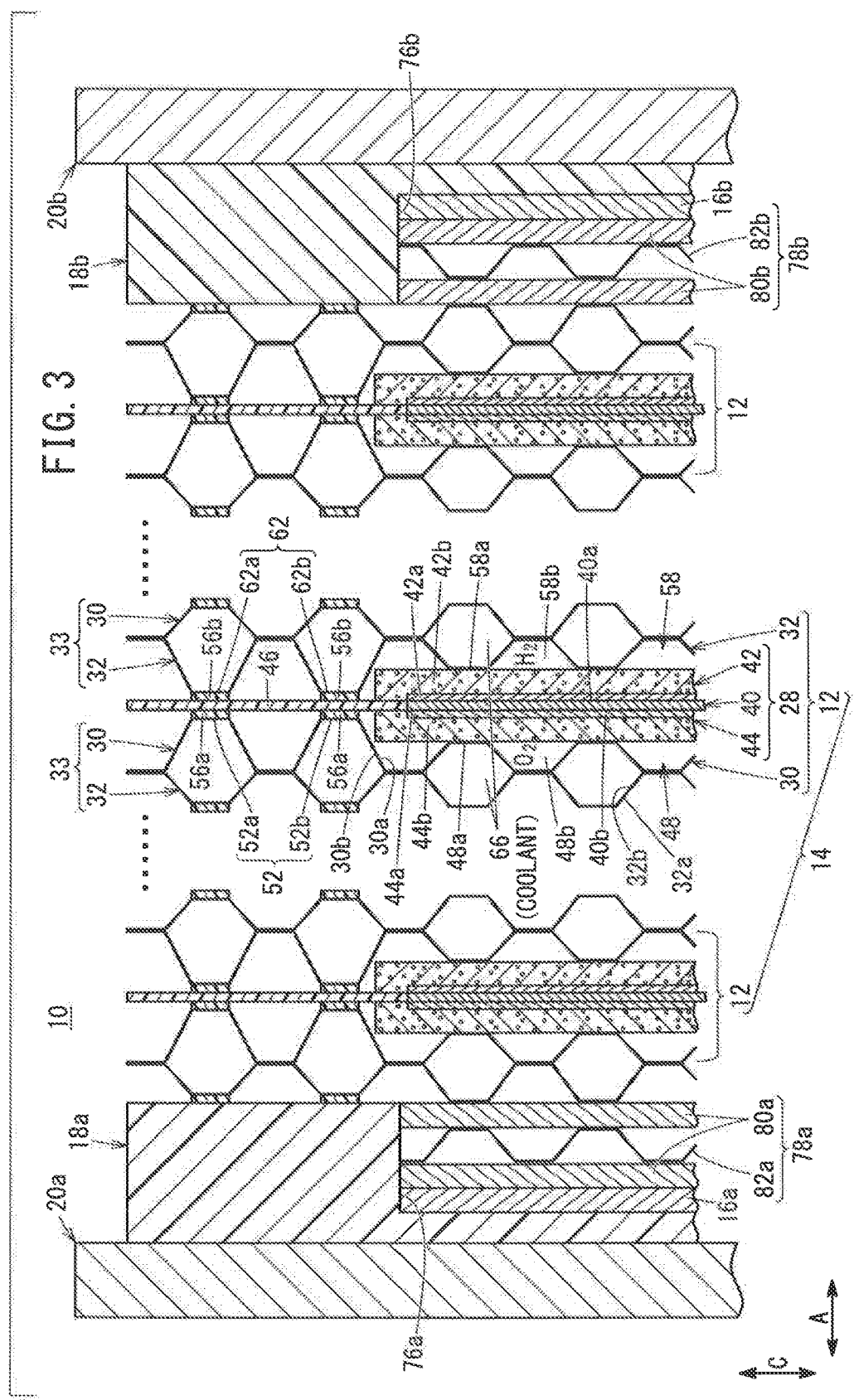
FIG. 3 is a cross sectional view of the fuel cell stack, taken along line III-III in FIG. 2.
Figure 4:
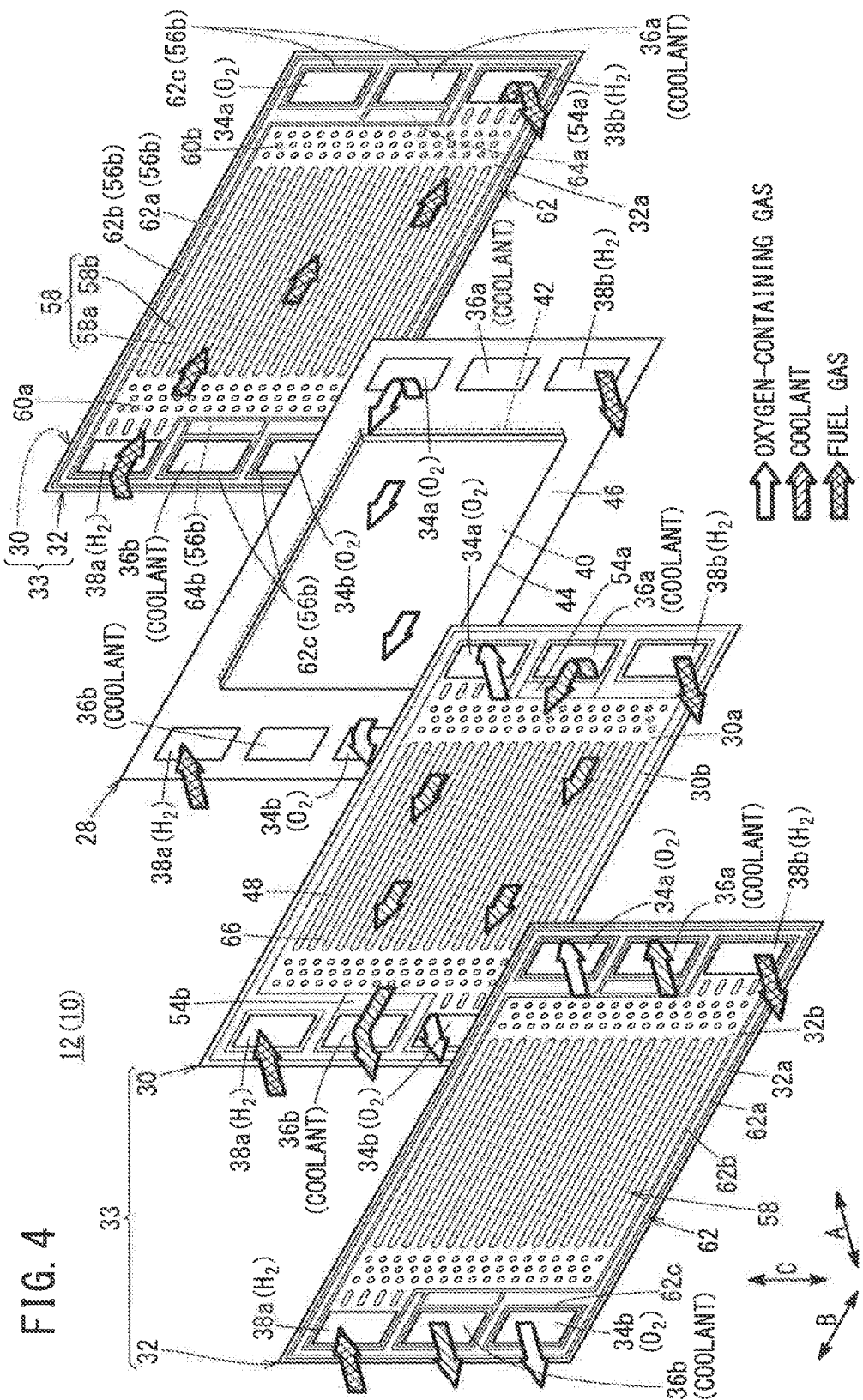
FIG. 4 is an exploded perspective view showing a power generation cell of the fuel cell stack.

As shown in FIGS. 3 and 4, each of the power generation cells 12 is formed by sandwiching a resin film equipped MEA (membrane electrode assembly) 28 between a first metal separator 30 and a second metal separator 32. For example, each of the first metal separator 30 and the second metal separator 32 is a metal plate such as steel plate, stainless steel plate, aluminum plate, plated steel sheet, or metal plate having anti-corrosive surfaces by surface treatment, and is formed by corrugating such a metal plate by press forming to have a corrugated shape in cross section. Outer peripheries of the first metal separator 30 and the second metal separator 32 are joined together by welding, brazing, crimping, etc. to form a joint separator 33.

At one end of the power generation cell 12 in a long-side direction of the power generation cell 12 indicated by an arrow B (horizontal direction in FIG. 4), an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the power generation cell 12 in the direction indicated by the arrow A. The oxygen-containing gas supply passage 34a, the coolant supply passage 36a, and the fuel gas discharge passage 38b are arranged in the direction indicated by an arrow C. An oxygen-containing gas is supplied through the oxygen-containing gas supply passage 34a. A coolant is supplied through the coolant supply passage 36a, and a fuel gas such as a hydrogen-containing gas is discharged through the fuel gas discharge passage 38b.

At the other end of the power generation cell 12 in the direction indicated by the arrow B, a fuel gas supply passage 38a, a coolant discharge passage 36b, and an oxygen-containing gas discharge passage 34b are provided. The fuel gas supply passage 38a, the coolant discharge passage 36b, and the oxygen-containing gas discharge passage 34b extend through the power generation cell 12 in the direction indicated by the arrow A. The fuel gas supply passage 38a, the coolant discharge passage 36b, and the oxygen-containing gas discharge passage 34b are arranged in the direction indicated by the arrow C. The fuel gas is supplied through the fuel gas supply passage 38a, the coolant is discharged through the coolant discharge passage 36b, and the oxygen-containing gas is discharged through the oxygen-containing gas discharge passage 34b. The positions of the oxygen-containing gas supply passage 34a, the oxygen-containing gas discharge passage 34b, the fuel gas supply passage 38a, and the fuel gas discharge passage 38b are not limited to the present embodiment, and may be determined as necessary according to required specifications.

As shown in FIG. 3, the resin film equipped MEA 28 has a frame-shaped resin film 46 at its outer periphery. For example, the resin film equipped MEA 28 includes an anode 42, a cathode 44, and a solid polymer electrolyte membrane (cation exchange membrane) 40 interposed between the anode 42 and the cathode 44. The solid polymer electrolyte membrane 40 is a thin membrane of perfluorosulfonic acid containing water.

A fluorine based electrolyte may be used for the solid polymer electrolyte membrane 40. Alternatively, an HC (hydrocarbon) based electrolyte may be used for the solid polymer electrolyte membrane 40. The plane size (outer size) of the solid polymer electrolyte membrane 40 is smaller than the plane size (outer size) of the anode 42 and the plane size (outer size) of the cathode 44. The solid polymer electrolyte membrane 40 is overlapped with the outer peripheries of the anode 42 and the cathode 44.

The anode 42 includes a first electrode catalyst layer 42a joined to a surface 40a of the solid polymer electrolyte membrane 40, and a first gas diffusion layer 42b stacked on the first electrode catalyst layer 42a. The outer size of the first electrode catalyst layer 42a is smaller than the outer size of the first gas diffusion layer 42b, and the same as (or smaller than) the outer size of the solid polymer electrolyte membrane 40. It should be noted that the outer size of the first electrode catalyst layer 42a may be the same as the first gas diffusion layer 42b.

The cathode 44 includes a second electrode catalyst layer 44a joined to a surface 40b of the solid polymer electrolyte membrane 40, and a second gas diffusion layer 44b stacked on the second electrode catalyst layer 44a. The outer size of the second electrode catalyst layer 44a is smaller than the outer size of the second gas diffusion layer 44b, and the same as (or smaller than) the outer size of the solid polymer electrolyte membrane 40. It should be noted that the outer size of the second electrode catalyst layer 44a may be the same as the second gas diffusion layer 44b.

The first electrode catalyst layer 42a is formed by depositing porous carbon particles uniformly on the surface of the first gas diffusion layer 42b. Platinum alloy is supported on surfaces of the carbon particles. The second electrode catalyst layer 44a is formed by depositing porous carbon particles uniformly on the surface of the second gas diffusion layer 44b. Platinum alloy is supported on surfaces of the carbon particles. Each of the first gas diffusion layer 42b and the second gas diffusion layer 44b comprises a carbon paper, a carbon cloth, etc. The first electrode catalyst layer 42a and the second electrode catalyst layer 44a are formed respectively on both surfaces 40a, 40b of the solid polymer electrolyte membrane 40.

A resin film 46 (resin frame member) having a frame shape is sandwiched between an outer marginal portion of the first gas diffusion layer 42b and an outer marginal portion of the second gas diffusion layer 44b. An inner end face of the resin film 46 is placed in close proximity to or in abutment against an outer end face of the solid polymer electrolyte membrane 40. As shown in FIG. 4, the oxygen-containing gas supply passage 34a, the coolant supply passage 36a, and the fuel gas discharge passage 38b are provided at one end of the resin film 46 in the direction indicated by the arrow B. The fuel gas supply passage 38a, the coolant discharge passage 36b, and the oxygen-containing gas discharge passage 34b are provided at the other end of the resin film 46 in the direction indicated by the arrow B.

For example, the resin film 46 is made of PPS (polyphenylene sulfide), PPA (polyphthalamide), PEN (polyethylene naphthalate), PES (polyether sulfone), LCP (liquid crystal polymer), PVDF (polyvinylidene fluoride), a silicone resin, a fluorine resin, m-PPE (modified polyphenylene ether resin), PET (polyethylene terephthalate), PBT (polybutylene terephthalate), or modified polyolefin. It should be noted that the solid polymer electrolyte membrane 40 may protrude outward without using the resin film 46. Further, frame shaped resin films may be provided on both sides of the solid polymer electrolyte membrane 40 which protrudes outward.

Figure 5:
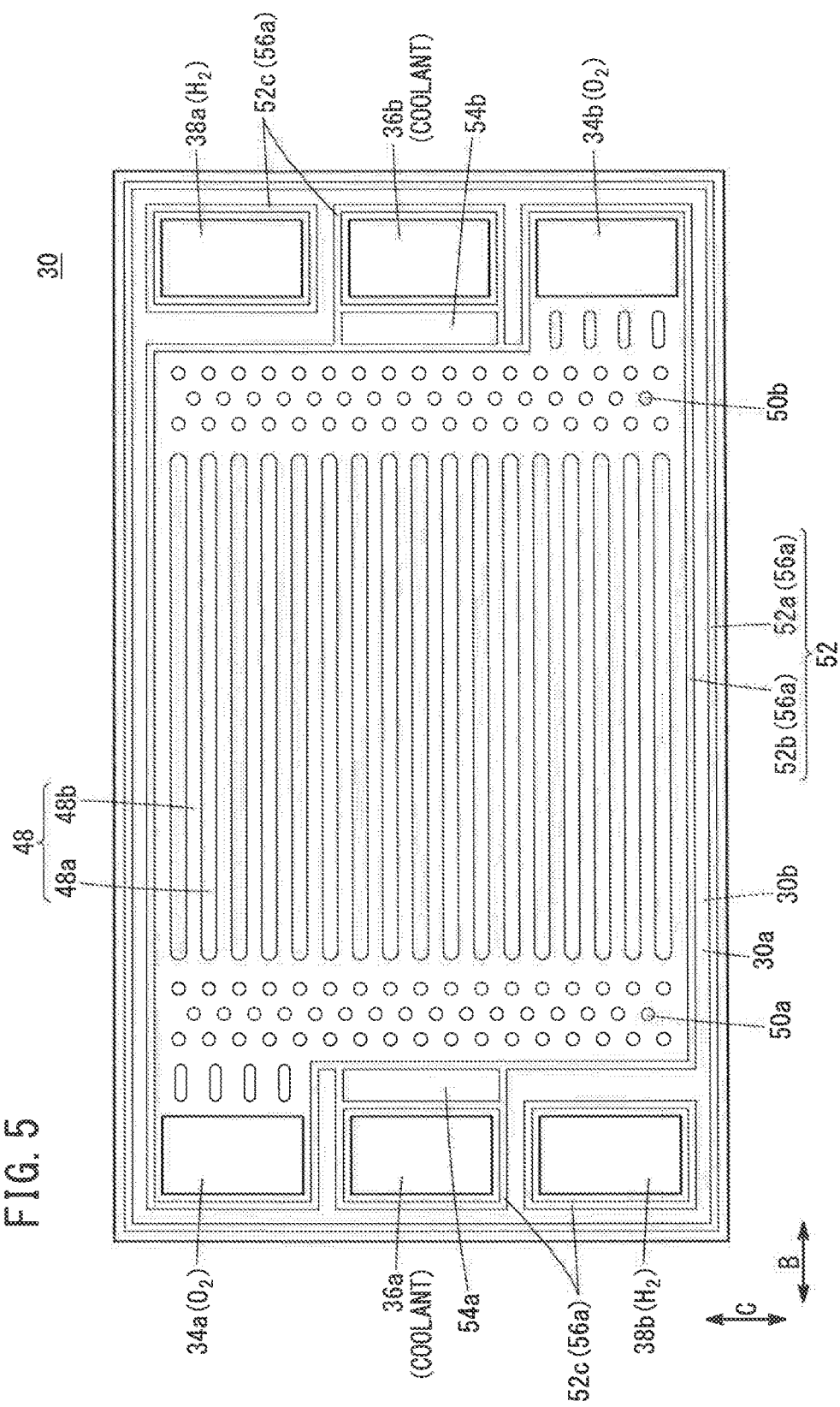
FIG. 5 is a front view showing a first metal separator of the power generation cell.

As shown in FIG. 4, the first metal separator 30 has an oxygen-containing gas flow field 48 on a surface 30a thereof that faces the resin film equipped MEA 28. For example, the oxygen-containing gas flow field 48 extends in the direction indicated by the arrow B. As shown in FIG. 5, the oxygen-containing gas flow field 48 is connected to the oxygen-containing gas supply passage 34a and the oxygen-containing gas discharge passage 34b for allowing the oxygen-containing gas to flow from the oxygen-containing gas supply passage 34a through the oxygen-containing gas flow field 48 to the oxygen-containing gas discharge passage 34b. The oxygen-containing gas flow field 48 includes straight flow grooves (or wavy flow grooves) 48b between a plurality of ridges 48a extending in the direction indicated by the arrow B.

An inlet buffer 50a having a plurality of bosses is provided between the oxygen-containing gas supply passage 34a and the oxygen-containing gas flow field 48. An outlet buffer 50b having a plurality of bosses is provided between the oxygen-containing gas discharge passage 34b and the oxygen-containing gas flow field 48.

A first seal line (metal bead seal) 52 is formed on the surface 30a of the first metal separator 30 by press forming, integrally with (or separately from) the oxygen-containing gas flow field 48 having a corrugated shape in cross section, the inlet buffer 50a, and the outlet buffer 50b. The first seal line 52 protrudes toward the resin film equipped MEA 28. The first seal line 52 includes an outer bead (seal bead) 52a formed around the outer marginal portion of the surface 30a. The first seal line 52 has a tapered shape in cross section toward the front end of the first seal line 52. The front end of the first seal line 52 has a flat shape or an R shape. Further, the first seal line 52 includes an inner bead (seal bead) 52b formed around the oxygen-containing gas flow field 48, the oxygen-containing gas supply passage 34a, and the oxygen-containing gas discharge passage 34b, while allowing the oxygen-containing gas flow field 48 to be connected to the oxygen-containing gas supply passage 34a and the oxygen-containing gas discharge passage 34b.

Further, the first seal line 52 includes passage beads (seal beads) 52c formed respectively around the fuel gas supply passage 38a, the fuel gas discharge passage 38b, the coolant supply passage 36a, and the coolant discharge passage 36b. The outer bead 52a, the inner bead 52b, and the passage beads 52c protrude from the surface 30a. Incidentally, the outer bead 52a may be provided as necessary, and thus the outer bead 52a may not be provided.

An inlet channel 54a is formed between the passage bead 52c around the coolant supply passage 36a, and the inner bead 52b. The inlet channel 54a protrudes from the surface 30a. An outlet channel 54b is formed between the passage bead 52c around the coolant discharge passage 36b, and the inner bead 52b. The outlet channel 54b protrudes from the surface 30a. The inlet channel 54a and the outlet channel 54b form channels connecting a coolant flow field 66 (described later) on a surface 30b to the coolant supply passage 36a and the coolant discharge passage 36b.

In the first seal line 52, as shown in FIG. 3, resin material 56a is fixed to each of protruding front end surfaces of the outer bead 52a and the inner bead 52b by printing or coating. For example, polyester fiber is used as the resin material 56a. As shown in FIG. 5, resin material 56a is fixed to a protruding front end surface of the passage bead 52c by printing or coating. Alternatively, punched out planar sheets having the same planar shapes as the outer bead 52a, the inner bead 52b, and the passage beads 52c may be attached to the surface 30a of the first metal separator 30.

As shown in FIG. 4, the second metal separator 32 has a fuel gas flow field 58 on a surface 32a thereof that faces the resin film equipped MEA 28. For example, the fuel gas flow field 58 extends in the direction indicated by the arrow B. The fuel gas flow field 58 is in fluid communication with the fuel gas supply passage 38a and the fuel gas discharge passage 38b. That is, fuel gas can flow from the fuel gas supply passage 38a through the fuel gas flow field 58 to the fuel gas discharge passage 38b. The fuel gas flow field 58 includes straight flow grooves (or wavy flow grooves) 58b between a plurality of ridges 58a extending in the direction indicated by the arrow B.

An inlet buffer 60a having a plurality of bosses is provided between the fuel gas supply passage 38a and the fuel gas flow field 58. An outlet buffer 60b having a plurality of bosses is provided between the fuel gas discharge passage 38b and the fuel gas flow field 58.

A second seal line (metal bead seal) 62 is formed on the surface 32a of the second metal separator 32 by press forming, integrally with (or separately from) the fuel gas flow field 58 having a corrugated shape in cross section, the inlet buffer 60a, and the outlet buffer 60b. The second seal line 62 protrudes toward the resin film equipped MEA 28. The second seal line 62 includes an outer bead (seal bead) 62a formed around the outer marginal portion of the surface 32a. The second seal line 62 has a tapered shape in cross section toward the front end of the second seal line 62. The front end of the second seal line 62 has a flat shape or an R shape. Further, the second seal line 62 includes an inner bead (seal bead) 62b formed around the fuel gas flow field 58, the fuel gas supply passage 38a, and the fuel gas discharge passage 38b, while allowing the fuel gas flow field 58 to be connected to the fuel gas supply passage 38a and the fuel gas discharge passage 38b.

Further, the second seal line 62 includes passage beads (seal beads) 62c formed respectively around the oxygen-containing gas supply passage 34a, the oxygen-containing gas discharge passage 34b, the coolant supply passage 36a, and the coolant discharge passage 36b. The outer bead 62a, the inner bead 62b, and the passage beads 62c protrude from the surface 32a. Incidentally, the outer bead 62a may be provided as necessary, and thus the outer bead 62a may not be provided.

An inlet channel 64a is formed between the passage bead 62c around the coolant supply passage 36a, and the inner bead 62b. The inlet channel 64a protrudes from the surface 32a. An outlet channel 64b is formed between the passage bead 62c around the coolant discharge passage 36b, and the inner bead 62b. The outlet channel 64b protrudes from the surface 32a. The inlet channel 64a and the outlet channel 64b form channels connecting the coolant flow field 66 (described later) on a surface 32b to the coolant supply passage 36a and the coolant discharge passage 36b.

In the second seal line 62, as shown in FIG. 3, resin material 56b is fixed to each of protruding front end surfaces of the outer bead 62a and the inner bead 62b by printing or coating. For example, polyester fiber is used as the resin material 56b. As shown in FIG. 4, resin material 56b is fixed to a protruding front end surface of the passage bead 62c by printing or coating. Alternatively, punched out planar sheets having the same planar shapes as the outer bead 62a, the inner bead 62b, and the passage beads 62c may be attached to the surface 32a of the second metal separator 32.

The coolant flow field 66 is formed between adjacent metal separators 30, 32 that are joined together, i.e., between the surface 30b of the first metal separator 30 and the surface 32b of the second metal separator 32. The coolant flow field 66 is in fluid communication with the coolant supply passage 36a and the coolant discharge passage 36b. The coolant flow field 66 is formed between the first metal separator 30 and the second metal separator 32 by stacking the back surface of the oxygen-containing gas flow field 48 and the back surface of the fuel gas flow field 58 together.

The terminal plates 16a, 16b shown in FIG. 2 are made of electrically conductive material. For example, the terminal plates 16a, 16b are made of metal such as copper, aluminum or stainless steel. Terminal members 68a, 68b are provided respectively at substantially the centers of the terminal plates 16a, 16b. The terminal members 68a, 68b extend outward in the stacking direction.

The terminal member 68a is inserted into an insulating tubular body 70a. The terminal member 68a passes through a hole 72a of the insulator 18a and a hole 74a of the end plate 20a, and protrudes outward from the end plate 20a. The terminal member 68b is inserted into an insulating tubular body 70b. The terminal member 68b passes through a hole 72b of the insulator 18b and a hole 74b of the end plate 20b, and protrudes outward from the end plate 20b.

The insulators 18a, 18b are made of insulating material such as polycarbonate (PC), phenolic resin, or the like. Recesses 76a, 76b are formed at the centers of the insulators 18a, 18b, respectively. The recesses 76a, 76b are opened to the stack body 14. Holes 72a, 72b are formed at the bottom surfaces of the recesses 76a, 76b, respectively.

The oxygen-containing gas supply passage 34a, the coolant supply passage 36a, and the fuel gas discharge passage 38b extend through one end of the insulator 18a and the end plate 20a in the direction indicated by the arrow B. The fuel gas supply passage 38a, the coolant discharge passage 36b, and the oxygen-containing gas discharge passage 34b extend through the other end of the insulator 18a and the end plate 20a in the direction indicated by the arrow B.

As shown in FIGS. 2 and 3, the terminal plate 16a and a heat insulating member 78a are placed in the recess 76a of the insulator 18a, and the terminal plate 16b and a heat insulating member 78b are placed in the recess 76b of the insulator 18b. The heat insulating member 78a includes a pair of first heat insulating members 80a and a second heat insulating member 82a interposed between the first heat insulating members 80a. For example, the first heat insulating member 80a are flat porous carbon plates, and the second heat insulating member 82a is a metal plate having a corrugated shape in cross section.

It should be noted that the first heat insulating members 80a may be made of the same material as the second heat insulating member 82a. Alternatively, the heat insulating member 78a may include one first heat insulating member 80a and one second heat insulating member 82a, while a resin spacer (not shown) may be interposed between the terminal plate 16a and the bottom of the recess 76a of the insulator 18a.

Further, the heat insulating member 78b has the same structure as the above heat insulating member 78a. The constituent elements of the heat insulating member 78b that are identical to those of the heat insulating member 78a are labeled with the same reference numerals (with suffix b instead of a), and detailed description thereof is omitted.

Next, a method of producing the joint separator 33 and the fuel cell stack 10 according to the first embodiment will be described below.

Figure 6:
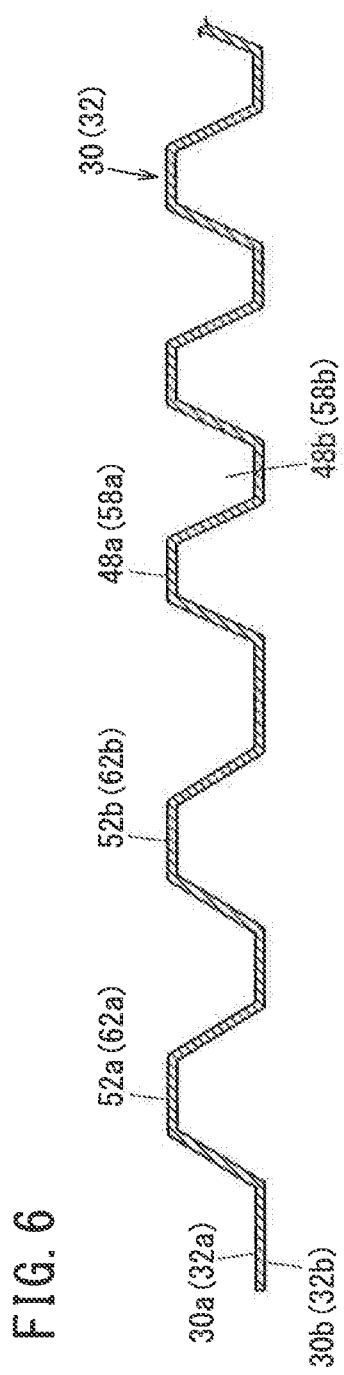
FIG. 6 is a view showing a state at the time of forming the first metal separator and a second metal separator.

Firstly, a metal thin flat plate (material) having a thickness in a range of 0.03 mm to 0.3 mm is prepared. The metal thin flat plate is subjected to press working (stamping), whereby the first metal separator 30 and the second metal separator 32 each having a corrugated shape in cross section are formed (see FIG. 6).

As shown in FIGS. 3 to 5, the ridges 48a forming the oxygen-containing gas flow field 48, and the outer bead 52a, the inner bead 52b, and the passage beads 52c forming the first seal line 52 are formed on the surface 30a of the first metal separator 30 so as to protrude therefrom. The inlet channel 54a and the outlet channel 54b as coolant connection channels are formed on the surface 30a so as to protrude therefrom (see FIGS. 4 and 5).

As shown in FIGS. 3 and 4, the ridges 58a forming the fuel gas flow field 58, and the outer bead 62a, the inner bead 62b, and the passage bead 62c forming the second seal line 62 are formed on the surface 32a of the second metal separator 32 so as to protrude therefrom. The inlet channel 64a and the outlet channel 64b as coolant connection channels are formed on the surface 32a so as to protrude therefrom (see FIG. 4).

Figure 7:
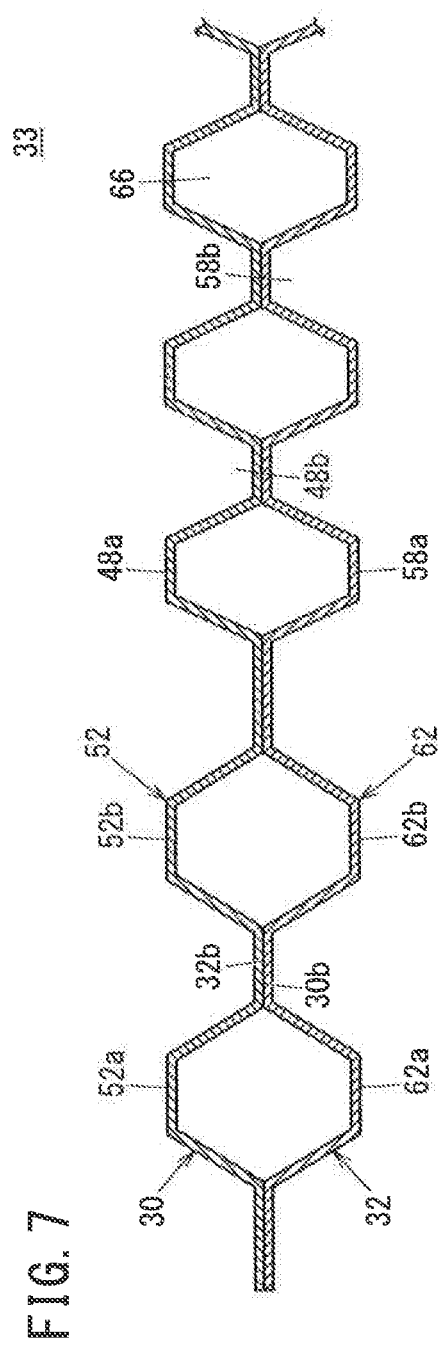
FIG. 7 is a view showing a state at the time of producing a joint separator by welding the first metal separator and the second metal separator together.

Further, as shown in FIG. 7, the first metal separator 30 and the second metal separator 32 are positioned in a state where the surface 30b (i.e., a surface opposite to a surface from which the seal bead protrudes) of the first metal separator 30 and the surface 32b (i.e., a surface opposite to a surface from which the seal bead protrudes) of the second metal separator 32 abut against each other. In this state, a ridge protruding from the surface 30b and a ridge protruding from the surface 32b are placed in abutment against each other, and the first metal separator 30 and the second metal separator 32 are joined together by welding, brazing, or crimping the outer marginal portions of the separators and the inner marginal portions of the oxygen-containing gas supply passage 34a, the oxygen-containing gas discharge passage 34b, the fuel gas supply passage 38a and the fuel gas discharge passage 38b to thereby form the joint separator 33.

Figure 8:
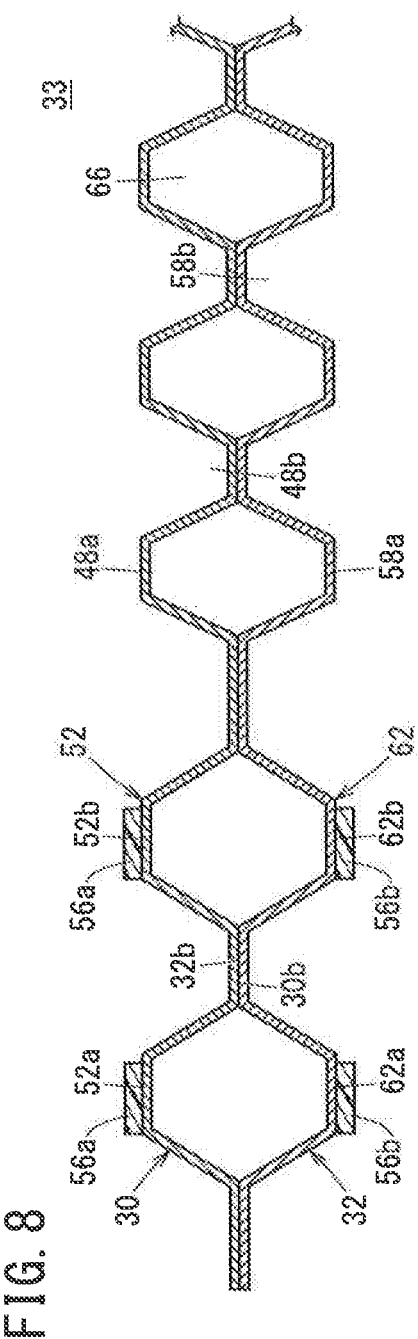
FIG. 8 is a view showing a state at the time of providing resin material on the joint separator.

Next, as shown in FIG. 8, in the first metal separator 30, the resin material 56a is fixed to each of the protruding front end surfaces of the outer bead 52a and the inner bead 52b by printing, etc. Likewise, as shown in FIG. 5, the resin material 56a is fixed to each of the protruding front end surfaces of the passage beads 52c by printing, etc.

In the meanwhile, in the second metal separator 32, the resin material 56b is fixed to each of the protruding front end surfaces of the outer bead 62a and the inner bead 62b by printing, etc. Likewise, as shown in FIG. 4, the resin material 56b is fixed to the protruding front end surfaces of the passage beads 62c by printing, etc. Alternatively, the resin material 56a, 56b may not be provided. Further, the resin material 56a, 56b may be provided on the surface of the outer resin frame of the resin film equipped MEA 28.

Figure 9:
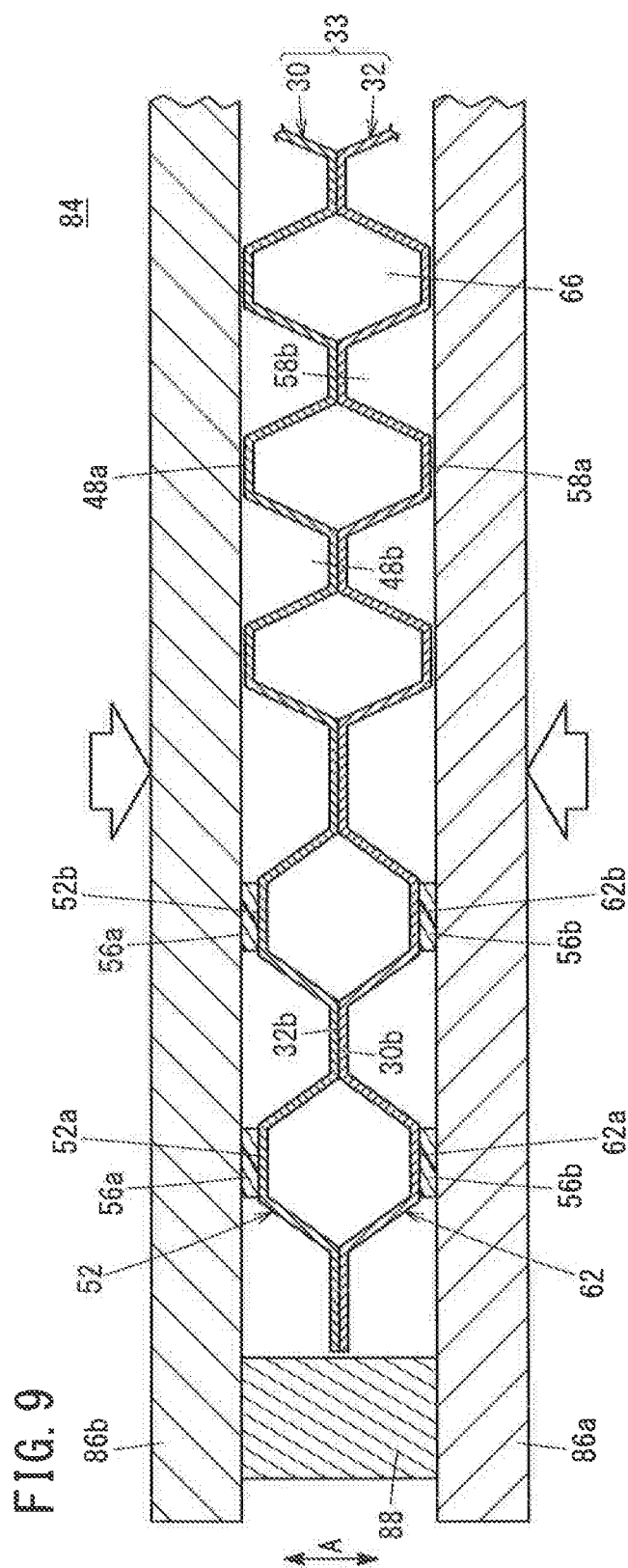
FIG. 9 is a view schematically showing a preliminary load application apparatus for applying a preliminary load to the joint separator.

As shown in FIG. 9, the joint separator 33 is placed in a preliminary load applying apparatus 84. The preliminary load applying apparatus 84 includes die members 86a, 86b which face each other to sandwich the joint separator 33, and a spacer 88 provided between the die members 86a, 86b. In the preliminary load applying apparatus 84, the joint separator 33 is sandwiched between the die members 86a, 86b, and a preliminary load is applied to the first seal line 52 and the second seal line 62. The preliminary load is the maximum load which is received in the stacking direction indicated by the arrow A during power generation of the fuel cell stack 10. The maximum load can be appropriately determined based on the power generation condition, the stack size, etc.

As shown in FIG. 3, after the preliminary load is applied to the joint separator 33, the joint separators 33 and the resin film equipped MEAs 28 are stacked alternately to thereby form the stack body 14. At one end of the stack body 14 in the stacking direction, the heat insulating member 78a, the terminal plate 16a, the insulator 18a, and the end plate 20a are arranged in this order from the inside to the outside (see FIG. 2). At the other end of the stack body 14 in the stacking direction, the heat insulating member 78b, the terminal plate 16b, the insulator 18b, and the end plate 20b are arranged in this order from the inside to the outside.

As shown in FIG. 1, the coupling bars 24 are provided between respective sides of the end plates 20a, 20b. Both ends of each of the coupling bars 24 are fixed to the inner surfaces of the end plates 20a, 20b though bolts 26, and a tightening load is applied to the stack body 14 in the stacking direction to assemble the fuel cell stack 10.

Operation of the fuel cell stack 10 having the above structure will be described below.

Firstly, as shown in FIG. 1, an oxygen-containing gas such as the air is supplied to the oxygen-containing gas supply passage 34a at the end plate 20a. A fuel gas such as a hydrogen-containing gas is supplied to the fuel gas supply passage 38a at the end plate 20a. A coolant such as pure water, ethylene glycol, oil, or the like is supplied to the coolant supply passage 36a at the end plate 20a.

As shown in FIG. 4, the oxygen-containing gas flows from the oxygen-containing gas supply passage 34a to the oxygen-containing gas flow field 48 at the first metal separator 30. The oxygen-containing gas flows along the oxygen-containing gas flow field 48 in the direction indicated by the arrow B, and the oxygen-containing gas is supplied to the cathode 44 of the membrane electrode assembly 28.

In the meanwhile, the fuel gas is supplied from the fuel gas supply passage 38a to the fuel gas flow field 58 of the second metal separator 32. The fuel gas flows along the fuel gas flow field 58 in the direction indicated by the arrow B, and the fuel gas is supplied to the anode 42 of the membrane electrode assembly 28.

Thus, in each of the membrane electrode assemblies 28, the oxygen-containing gas supplied to the cathode 44 and the fuel gas supplied to the anode 42 are consumed in the electrochemical reactions in the second electrode catalyst layer 44a and the first electrode catalyst layer 42a of the cathode 44 and the anode 42 for generating electricity.

Then, the oxygen-containing gas consumed at the cathode 44 flows along the oxygen-containing gas discharge passage 34b, and the oxygen-containing gas is discharged in the direction indicated by the arrow A. Likewise, the fuel gas consumed at the anode 42 flows along the fuel gas discharge passage 38b, and the fuel gas is discharged in the direction indicated by the arrow A.

Further, the coolant supplied to the coolant supply passage 36a flows into the coolant flow field 66 formed between the first metal separator 30 and the second metal separator 32. Then, the coolant flows in the direction indicated by the arrow B. After the coolant cools the membrane electrode assembly 28, the coolant is discharged from the coolant discharge passage 36b.

In the first embodiment, before assembling the fuel cell stack 10, a preliminary load is applied to the first seal line 52 of the first metal separator 30 and the second seal line 62 of the second metal separator 32 (see FIG. 9). In the structure, the first seal line 52 and the second seal line 62 are plastically deformed beforehand, in the stacking direction of the first metal separator 30 and the second metal separator 32.

Figure 10:
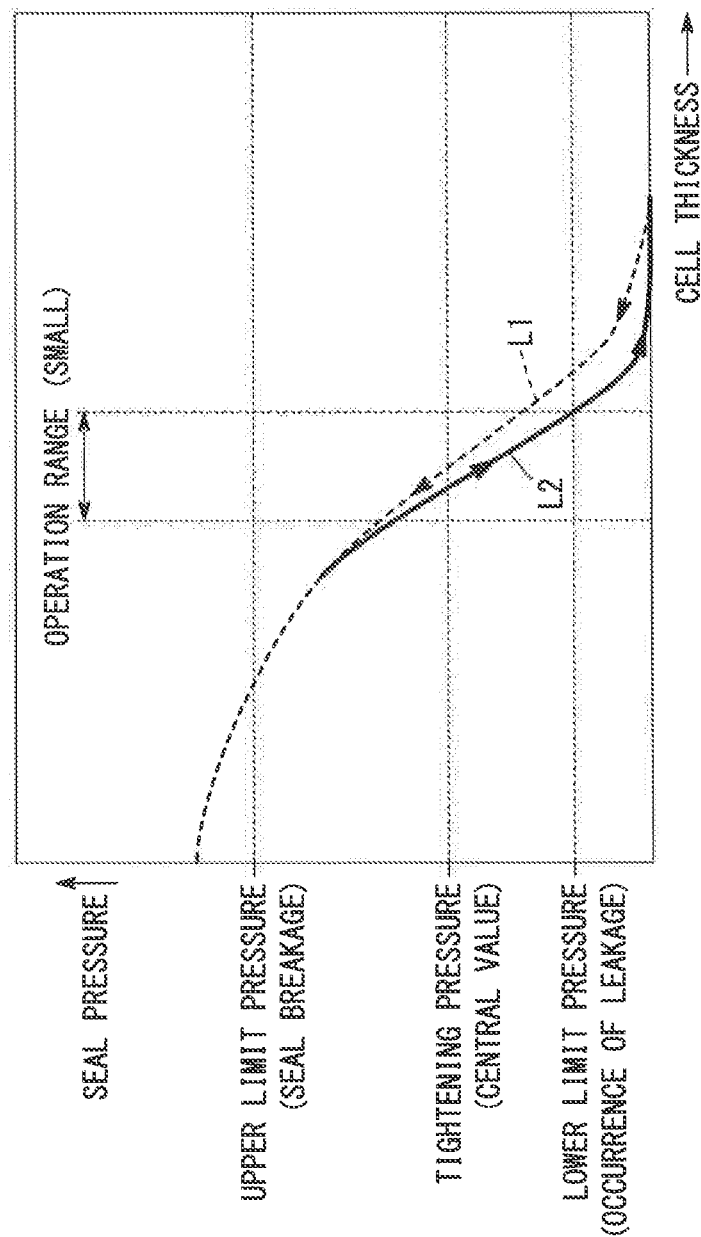
FIG. 10 is a graph showing an operation range of a joint separator to which no preliminary load is applied.

For example, in the case of the first metal separator 30 where no preliminary load is applied to the first seal line 52, if the first metal separator 30 is assembled into the fuel cell stack 10, the first seal line 52 tends to be plastically deformed easily when load change occurs during operation of the fuel cell stack 10. Therefore, as can be seen from FIG. 10, in the state where a load is applied and in the state where no load is applied, the first seal line 52 follows a load characteristic curve L1 before plastic deformation, and follows a different load characteristic curve L2 after plastic deformation. Consequently, the operation range within which a desired seal surface pressure is maintained becomes narrow. Therefore, it is not possible to obtain a wider operation range enough to withstand disturbances (temperature changes or collisions). It should be noted that FIG. 10 shows a relationship between the thickness of the power generation cell 12 (cell thickness) indicated by the horizontal axis and the pressure applied to the first seal line 52 (seal pressure) indicated by the vertical axis. Further, the vertical axis shows the upper limit pressure at which breakage of the first seal line 52 occurs, the lower limit pressure at which leakage occurs, and the tightening pressure at which a desired tightening state is achieved.

Figure 11:
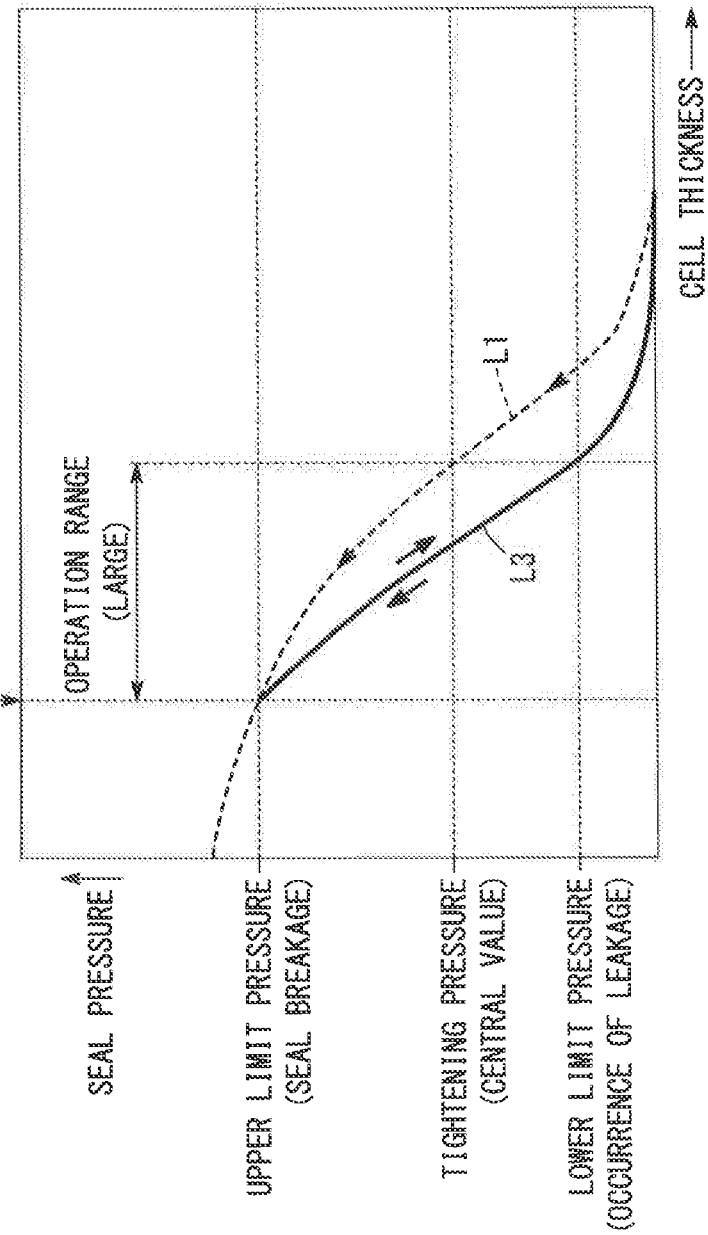
FIG. 11 is a graph showing an operation range of the joint separator according to the first embodiment of the present invention.

In contrast, in the first embodiment, the first seal line 52 is plastically deformed beforehand. Therefore, the first seal line 52 is not plastically deformed even if load change occurs during operation of the fuel cell stack 10. As shown in FIG. 11, the first seal line 52 follows the same load characteristic curve L3 in the state where the load is applied to the first seal line 52 and in the state where no load is applied to the first seal line 52. Consequently, the operation range is expanded. Thus, it is possible to obtain a load characteristics having a wider operation range enough to withstand disturbances (temperature changes and collisions), and it becomes possible to reliably obtain a desired seal surface pressure advantageously. Further, since a preliminary load is applied after the first and second metal separators 30, 32 have been joined together, it is possible to correct deformation of the first and second metal separators 30, 32 caused at the time of joining.

In this regard, the relationship of k1>k3>k2 is satisfied, where k1 denotes an elastic modulus of the first metal separator 30, k2 denotes an elastic modulus of the resin film 46, and k3 denotes an elastic modulus of the resin material 56a. Therefore, it is sufficient to apply a preliminary load to only the first metal separator 30. It should be noted that the relationship of k1>k2 is satisfied in the case where the resin material 56a is not used.

Although the present invention has been described in connection with the first embodiment where, before stacking of the joint separators and the MEAs, the resin material 56a, 56b is provided on the joint separator 33 and then the preliminary load is applied to the joint separator 33, the present invention is not limited in this respect. For example, before stacking of the joint separators and the MEAs, the preliminary load may be applied to the joint separator 33 with no resin material 56a, 56b provided.

Further, though the preliminary load is applied to the joint separator 33, the present invention is not limited in this respect. The first embodiment adopts a cooling structure on a cell-by-cell basis where a membrane electrode assembly is sandwiched between two metal separators to form a cell unit, and a coolant flow field is formed between the adjacent cell units. Alternatively, for example, it is possible to adopt another structure where a cell unit includes three or more metal separators and two or more membrane electrode assemblies, and the metal separators and the membrane electrode assemblies are stacked alternately. In this case, the coolant flow field is formed between the adjacent cell units to form so-called skip cooling structure.

In the skip cooling structure, a fuel gas flow field is formed on one surface of a single metal separator, and an oxygen-containing gas flow field is formed on the other surface of the single metal separator. In the structure, since one metal separator is provided between the membrane electrode assemblies, the preliminary load may be applied to the one metal separator. In this case, the preliminary load is applied to the one metal separator before assembling of the cell unit. Incidentally, in the case of producing (assembling) of the cooling structure on a cell-by-cell basis, the preliminary load may be applied to one metal separator before assembling of the cell unit.

Next, a production method according to a second embodiment of the present invention will be described.

Figure 12:
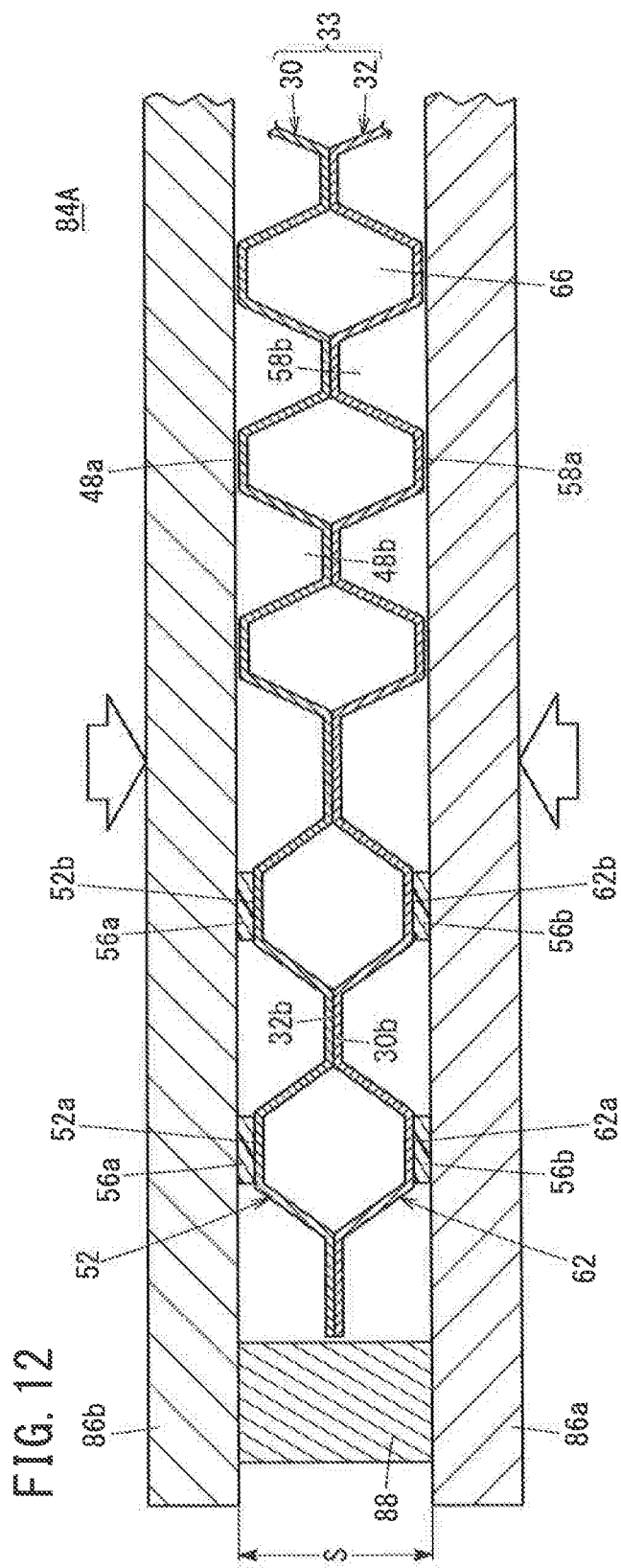
FIG. 12 is a view schematically showing a preliminary load application apparatus according to a second embodiment of the present invention.

In the second embodiment, as shown in FIG. 12, a preliminary load is applied to a joint separator 33 by a preliminary load applying apparatus 84A. The preliminary load applying apparatus 84A applies the preliminary load to the joint separator 33 by compressing the joint separator 33 to a fixed thickness S. For example, the fixed thickness S corresponds to a thickness to which the joint separator 33 is compressed when the maximum load is applied to the joint separator 33 during power generation of the fuel cell stack 10.

As described above, in the second embodiment, the preliminary load corresponding to the fixed size (thickness S) is applied to the joint separator 33. Therefore, as shown in FIG. 13, the first seal line 52 is not plastically deformed even if load changes occur during operation of the fuel cell stack 10. The first seal line 52 follows the same load characteristic curve L4. Thus, it becomes possible to reduce variation of the load characteristic curves La, Lb, and Lc due to size variation which may occur in the press forming process.

Accordingly, the same advantages as in the case of the first embodiment are obtained. For example, the operation range is expanded. It is possible to obtain the wide load characteristics which makes it possible to withstand the disturbance (temperature changes and collisions), and reliably obtain a desired seal surface pressure.

While the invention has been particularly shown and described with reference to preferred embodiments, it will be understood that variations and modifications can be effected thereto by those skilled in the art without departing from the scope of the invention as defined by the appended claims.

What is claimed is:

1. A method of producing a fuel cell stack, the fuel cell stack comprising a plurality of power generation cells stacked in a stacking direction, the power generation cells each including a membrane electrode assembly and metal separators, the membrane electrode assembly including a pair of electrodes and an electrolyte membrane interposed between the electrodes, a fuel gas flow field configured to supply a fuel gas to one of the electrodes and an oxygen-containing gas flow field configured to supply an oxygen-containing gas to another of the electrodes being formed between the membrane electrode assembly and the metal separators, the method comprising the steps of:
forming a seal bead around at least the fuel gas flow field or the oxygen-containing gas flow field by press forming of the metal separators, so that each of the metal separators has a first surface from which the seal bead protrudes, and a second surface opposite to the first surface;
joining two adjacent metal separators together to form joined metal separators in a state where the second surfaces of the two adjacent metal separators abut against each other such that the second surfaces form a furrow portion of the joined metal separators and the first surface forms a ridge portion of the joined metal separators;
plastically deforming the seal bead by applying a preliminary load to the seal bead; and
stacking the metal separators and the membrane electrode assembly, and applying a tightening load to the metal separators and the membrane electrode assembly in the stacking direction to thereby assemble the fuel cell stack.

2. The method of producing a fuel cell stack according to claim 1, wherein the preliminary load applied to the seal bead is a maximum load which is received in the stacking direction during power generation of the fuel cell stack.

3. The method of producing a fuel cell stack according to claim 1,
wherein a resin frame member is provided on an outer periphery of the membrane electrode assembly, and a relationship of k1>k2 is satisfied, where k1 denotes an elastic modulus of the metal separators, and k2 denotes an elastic modulus of the resin frame member.

4. The method of producing a fuel cell stack according to claim 3, wherein a resin material is provided on a top of the seal bead, and a relationship of k1>k3>k2 is satisfied, where k3 denotes an elastic modulus of the resin material.

5. A method of producing a metal separator for a fuel cell, the metal separator and a membrane electrode assembly being stacked together to form a power generation cell, the membrane electrode assembly including a pair of electrodes and an electrolyte membrane interposed between the electrodes, a fuel gas flow field configured to supply a fuel gas to one of the electrodes and an oxygen-containing gas flow field configured to supply an oxygen-containing gas to another of the electrodes being formed in the metal separator,
the method comprising the steps of:
forming a seal bead around at least the fuel gas flow field or the oxygen-containing gas flow field by press forming of the metal separator, a resin material being fixed on a top of the seal bead; and
plastically deforming the seal bead by applying a preliminary load to the seal bead such that a desired seal surface pressure is achieved.

6. The method of producing a metal separator for a fuel cell according to claim 5, wherein the preliminary load applied to the seal bead is a maximum load which is received in a stacking direction of the metal separator during power generation of the fuel cell.

7. The method of producing a metal separator for a fuel cell according to claim 5, wherein the metal separator is a metal separator of a cell unit including three or more metal separators and two or more membrane electrode assemblies, the metal separator being provided between two of the membrane electrode assemblies.

8. A method of producing a fuel cell stack, the fuel cell stack comprising a plurality of power generation cells stacked in a stacking direction, the power generation cells each including a membrane electrode assembly and metal separators, the membrane electrode assembly including a pair of electrodes and an electrolyte membrane interposed between the electrodes, a fuel gas flow field configured to supply a fuel gas to one of the electrodes and an oxygen-containing gas flow field configured to supply an oxygen-containing gas to another of the electrodes being formed between the membrane electrode assembly and the metal separators,
the method comprising the steps of:
forming a seal bead around at least the fuel gas flow field or the oxygen-containing gas flow field by press forming of the metal separators, so that each of the metal separators has one surface from which the seal bead protrudes and another surface opposite to the one surface;
joining two adjacent ones of the metal separators together in a state where the other surfaces of the metal separators abut against each other;
plastically deforming the seal bead by applying a preliminary load to the seal bead; and
stacking the metal separators and the membrane electrode assembly, and applying a tightening load to the metal separators and the membrane electrode assembly in the stacking direction to thereby assemble the fuel cell stack,
wherein:
a resin frame member is provided on an outer periphery of the membrane electrode assembly, and
a relationship of k1>k2 is satisfied, where k1 denotes an elastic modulus of the metal separators, and k2 denotes an elastic modulus of the resin frame member.

9. The method of producing a fuel cell stack according to claim 8, wherein a resin material is provided on a top of the seal bead, and a relationship of k1>k3>k2 is satisfied, where k3 denotes an elastic modulus of the resin material.

* * * * *